United States Patent
Chen et al.

(10) Patent No.: US 8,812,524 B2
(45) Date of Patent: Aug. 19, 2014

(54) METHOD AND SYSTEM FOR PRESERVING PRIVACY OF A DATASET

(75) Inventors: Ya-Ling Chen, Hsinchu (TW); Ci-Wei Lan, Taipei (TW); Tyrone W Grandison, Armonk, NY (US); Jen-Hao Hsiao, Taipei (TW); Li-Feng Tseng, Taipei (TW); Yi-Hui Chen, Taipei (TW)

(73) Assignees: Industrial Technology Research Institute, Hsinchu (TW); International Business Machines Corporation, Armonk, NY (US)

( * ) Notice: Subject to any disclaimer, the term of this patent is extended or adjusted under 35 U.S.C. 154(b) by 68 days.

(21) Appl. No.: 13/586,891

(22) Filed: Aug. 16, 2012

(65) Prior Publication Data

US 2013/0198194 A1 Aug. 1, 2013

(30) Foreign Application Priority Data

Jan. 31, 2012 (TW) .............................. 101103156 A (51) Int. Cl.
*G06F 17/30* (2006.01)
*G06F 21/62* (2013.01)

(52) U.S. Cl.
CPC .............................. *G06F 21/6254* (2013.01); *G06F 17/30539* (2013.01)
USPC ........................................................ 707/757

(58) Field of Classification Search
CPC . G06F 21/6254; G06F 21/6245; G06F 21/60; G06F 17/30539; H04W 12/02; Y10S 707/99939
USPC ........................................................ 707/757
See application file for complete search history.

(56) References Cited

U.S. PATENT DOCUMENTS

| | | | |
|---|---|---|---|
| 7,877,398 B2 * | 1/2011 | Kroeschel et al. | 707/757 |
| 8,112,422 B2 * | 2/2012 | Srivastava et al. | 707/737 |
| 8,326,849 B2 * | 12/2012 | El Emam et al. | 707/756 |
| 8,544,104 B2 * | 9/2013 | Burke et al. | 726/26 |
| 2002/0169793 A1 * | 11/2002 | Sweeney | 707/204 |
| 2011/0119661 A1 | 5/2011 | Agrawal et al. | |
| 2012/0197915 A1 * | 8/2012 | Miyakawa | 707/755 |

OTHER PUBLICATIONS

Chuang-Cheng Chiu et al., "A k-Anonymit Clustering Method for Effective Data Privacy Preservation", Proceedings of the 3rd international conference on Advanced Data Mining, and Applications, Aug. 2007, p. 89-99.

(Continued)

*Primary Examiner* — Jorge A Casanova
(74) *Attorney, Agent, or Firm* — Jianq Chyun IP Office (57) ABSTRACT

A method and a system for preserving privacy of a dataset are provided. In the method, a k-anonymity value with respect to a sensitive data field is determined according to at least one first quasi-identifier. Data entries in each group have the same value in the one or more fields of the first quasi-identifier and data entries in different groups have different values in the one or more fields of the first quasi-identifier. A first group and a second group among the plurality of groups are determined according to the reference number Kr, where the first group and the second group are merged into a merging group. The number of data entries in the merging group is not less than a reference number Kr. One or more fields of at least one first quasi-identifier is masked for the merging group.

12 Claims, 6 Drawing Sheets

(56) References Cited

OTHER PUBLICATIONS

Patrick Sharkey et al., "Privacy-Preserving Data Mining through Knowledge Model Sharing", Lecture Notes in Computer Science 4980, Oct. 2008, p. 97-115.

Pierangela Samarati et al., "Protecting Privacy when Disclosing Information: k-Anonymity and Its Enforcement through Generalization and Suppression", Proceedings of the IEEE Symposium on Research in Security and Privacy (S&P). May 1998, p. 1-19.

Ashwin Machanavajjhala et al., "I-Diversity: Privacy Beyond k-Anonymity", ACM Transactions on Knowledge Discovery from Data, vol. 1, Issue 1, Mar. 2007, p. 1-12.

Arik Friedman et al., "i-Anonymous Decision Tree Induction", The 10th European Conference on Principles and Practice of Knowledge Discovery in Databases, Sep. 2006, p. 1-12.

Jiuyong Li et al., "Achieving k-Anonymity by Clustering in Attribute Hierarchical Structures", in Proceedings of the 8th International Conference on Data Warehousing and Knowledge Discovery, Sep. 2006, p. 1-10.

Pierangela Samarati, "Protecting Respondents' Identities in Microdata Release", IEEE Transactions on Knowledge and Data Engineering, vol. 13, No. 6, Nov./Dec. 2001, p. 1010-1027.

V. Ciriani et al., "Microdata Protection", Advances in Information Security 2007, Apr. 2007, p. 1-36.

V. Ciriani et al., "k-Anonymity", Advances in Information Security 2007, Apr. 2007, p. 1-36.

* cited by examiner

Public information

| Name | Gender | Date of Birth | ZIP | Height | Weight |
|---|---|---|---|---|---|
| Allen Chang | F | 41.08.16 | 11073 | ~150 | ~55 |
| Bill Wang | F | 44.03.28 | 11046 | ~150 | ~55 |
| Cat Lee | F | 42.07.01 | 11058 | ~155 | ~60 |
| Dong Gua | M | 55.05.20 | 11059 | ~165 | ~80 |
| Emily Tsu | F | 58.06.18 | 11073 | ~170 | ~80 |
| Fanny Lu | F | 78.08.13 | 11059 | ~170 | ~85 |
| Gary Lee | F | 51.11.15 | 11073 | ~155 | ~65 |
| Helen Tsai | F | 46.12.10 | 11058 | ~155 | ~65 |
| Ivan Chen | M | 61.11.21 | 11046 | ~155 | ~70 |
| Jacob Lin | F | 45.05.15 | 11059 | ~145 | ~60 |
| Klm Chen | F | 46.12.09 | 11058 | ~150 | ~50 |
| Linda Lee | F | 70.10.20 | 11046 | ~165 | ~95 |
| Mary Mi | M | 63.01.12 | 11059 | ~160 | ~75 |

Published analytical results

| Gender | Date of Birth | ZIP | BMI | Disease |
|---|---|---|---|---|
| F | 38.04.02 | 11073 | 29.1 | Diabetes |
| F | 45.12.20 | 11058 | 24.7 | Hypertension |
| F | 39.10.01 | 11059 | 30.8 | Diabetes |
| M | 34.12.22 | 11059 | 29.7 | Diabetes |
| F | 52.12.06 | 11073 | 26.1 | Stroke |
| F | 44.03.28 | 11046 | 25.5 | Stroke |
| F | 44.04.26 | 11058 | 27.4 | Stroke |
| F | 58.04.06 | 11046 | 25.6 | Hypertension |
| M | 34.03.29 | 11073 | 29.5 | Stroke |
| F | 52.08.25 | 11058 | 28.5 | Stroke |
| F | 38.05.20 | 11073 | 32.9 | Diabetes |
| F | 44.03.15 | 11046 | 27.1 | Hypertension |
| M | 21.11.12 | 11059 | 29.5 | Diabetes |

FIG. 1

| Drug type | Purchase date | Store location | BMI | Disease | |
|---|---|---|---|---|---|
| F | 56 | 11046 | 24~28 | Hypertension | |
| F | 56 | 11046 | 24~28 | Hypertension | k=3,l=2 |
| F | 56 | 11046 | 24~28 | Stroke | |
| F | 68 | 11073 | >28 | Diabetes | |
| F | 68 | 11073 | >28 | Diabetes | k=4,l=1 |
| F | 68 | 11073 | >28 | Diabetes | |
| F | 68 | 11073 | >28 | Diabetes | |
| M | 48 | 11058 | >28 | Stroke | k=1,l=1 |
| M | 48 | 11073 | 24~28 | Stroke | k=1,l=1 |
| M | 56 | 11058 | 24~28 | Hypertension | k=2,l=2 |
| M | 56 | 11058 | 24~28 | Stroke | |
| M | 61 | 11059 | >28 | Diabetes | k=2,l=2 |
| M | 61 | 11059 | >28 | Stroke | | quasi-identifiers / sensitive data in this dataset
k-anonymity = 1
l-diversity = 1

| Gender | Age | ZIP | BMI | Disease |
|---|---|---|---|---|
| F | 62 | 11073 | 29.1 | Diabetes |
| F | 55 | 11058 | 24.7 | Hypertension |
| M | 61 | 11059 | 30.8 | Diabetes |
| F | 66 | 11059 | 29.7 | Diabetes |
| M | 58 | 11073 | 26.1 | Stroke |
| F | 56 | 11046 | 25.5 | Stroke |
| M | 56 | 11058 | 27.4 | Stroke |
| F | 42 | 11046 | 25.6 | Hypertension |
| M | 66 | 11073 | 29.5 | Stroke |
| M | 48 | 11058 | 28.5 | Stroke |
| F | 68 | 11073 | 32.9 | Diabetes |
| M | 56 | 11046 | 27.1 | Hypertension |
| F | 68 | 11059 | 29.5 | Diabetes |

METHOD AND SYSTEM FOR PRESERVING PRIVACY OF A DATASET

CROSS-REFERENCE TO RELATED APPLICATION

This application claims the priority benefit of Taiwan application serial no. 101103156, filed on Jan. 31, 2012. The entirety of the above-mentioned patent application is hereby incorporated by reference herein and made a part of this specification.

TECHNICAL FIELD

The disclosure relates to a method and a system for preserving privacy of a dataset.

BACKGROUND

Figure 1:
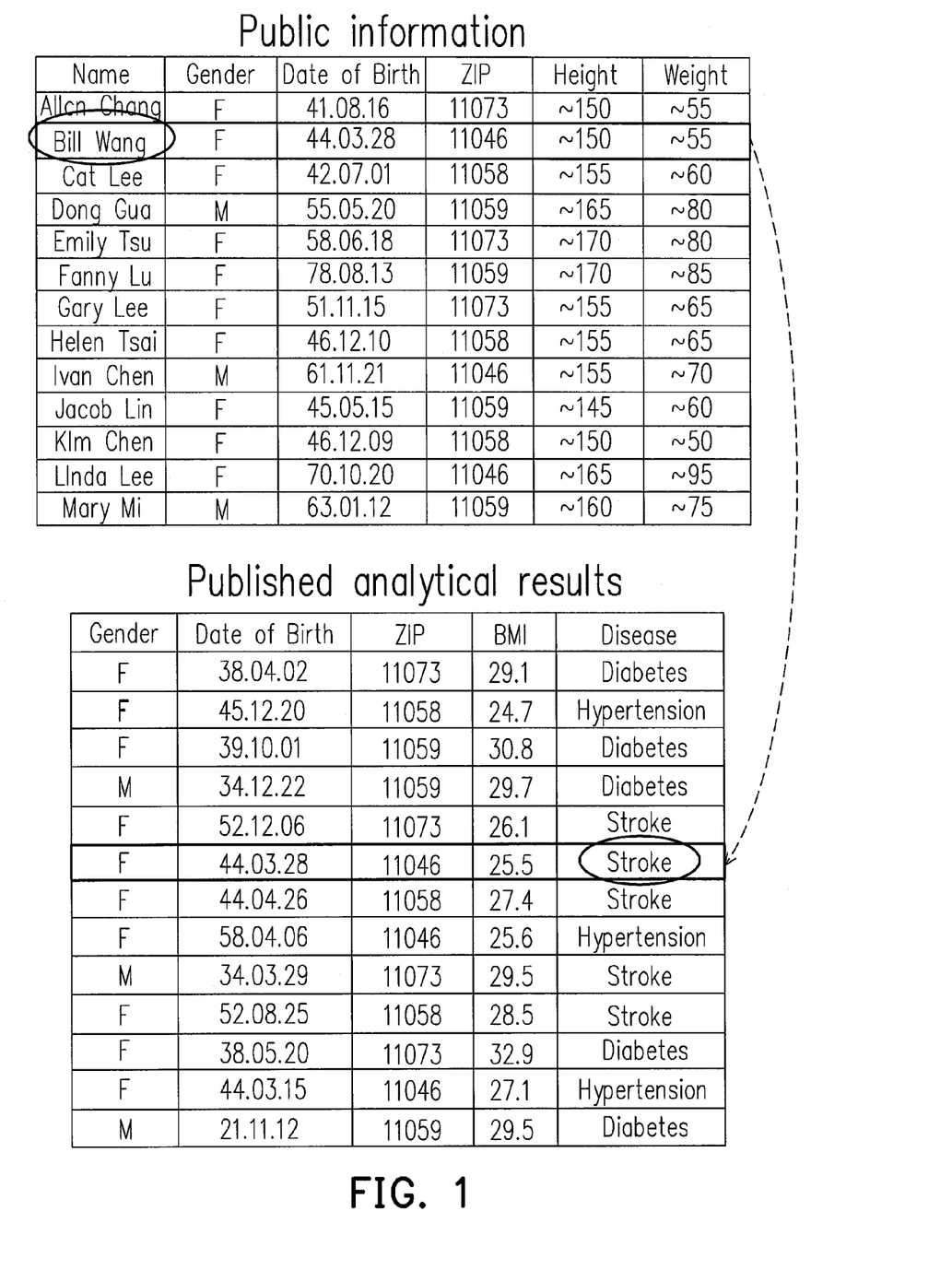
FIG. 1 illustrates the issue of invasion of privacy by comparing the anonymized dataset with related dataset.

Based on purposes of academic researches or of commerce actions, techniques of data mining have been widely applied to fields of medical record analysis and consumer behavior analysis. Generally, before the procedures of data mining of a dataset, for preserving privacy of the dataset being manipulated, a process to anonymize the field of names of individuals contained in the dataset is performed. However, by means of comparing the anonymized dataset with related dataset, as demonstrated in FIG. 1, chances are the privacy of one or more individuals is exposed, which leads to the issue of invasion of privacy.

Conventional methods used to deal with the issue of invasion of privacy described above need intervention of humans, with knowledge about the purposes and the manners of the procedures of data mining and the further analysis on the dataset, to determine relative and irrelative fields respectively and to keep the relative fields while masking the irrelative fields in respect of the subsequent process of data mining and analysis. In practice, however, it is almost impossible to know well in advance about the purposes and the manners being performed on the dataset, thus conventional methods need improvement in this regard.

There are some related literatures and technologies for cross-network authentication. For example, a literature provides a system and a method for automated determination of quasi-identifiers for sensitive data fields in a data set, which is incorporated herein by reference herewith. However, Agrawal et al. do not provide a method for masking one or more fields of quasi-identifiers.

Some literatures also introduce that the robustness of preservation of privacy can be determined according to the k-anonymity or l-diversity, or both, of the dataset. One way to increase the robustness of preservation of privacy of a dataset is to mask as many fields as possible. The more fields are masked, however, the less accurate the dataset becomes, and the less data utility as a result.

Conventional methods and prior arts mentioned above do not provide a flexible manner in respect of users' needs to preserve the privacy of a dataset appropriately while keeping the dataset accurate.

SUMMARY

In an embodiment of the disclosure, a method for preserving privacy of a dataset is provided, where the dataset has at least a sensitive data field and one or more fields of at least one first quasi-identifier. In the method, a k-anonymity value K with respect to the sensitive data field is determined according to the at least one first quasi-identifier. It is determined to adopt all or some of the at least one first quasi-identifier to categorize the dataset into a plurality of groups, if the k-anonymity value K is less than a reference number Kr. Data entries in each group have the same value in the one or more fields of at least one first quasi-identifier and data entries in different groups have different values in the one or more fields of at least one first quasi-identifier. The number of data entries in each group is determined. A first group among the plurality of groups is determined, where the number of data entries, N1, in the first group is less than the reference number Kr. A second group among the plurality of groups is determined, where when the first group and the second group are merged into a merging group, the number of data entries, Nm, in the merging group is not less than the reference number Kr. One or more fields of at least one first quasi-identifier is/are masked for the merging group.

In an embodiment of the disclosure, a product of computer programs stored in a computer accessible medium is provided. The product includes a set of computer readable programs for executing the method proposed above on one or more computer systems.

In an embodiment of the disclosure, a computer system is provided. The computer system includes a memory module and a processing unit, where a set of computer executable instructions are stored in the memory module, and the processing unit execute the set of computer executable instructions for proceeding the method proposed above.

It does not mean that all the features and advantages which can be carried into execution of the disclosure are put together in any single embodiment of the disclosure. The expressions and description of the features and advantages of the disclosure herein indicate the combination of all the features, advantages and properties revealed in at least one embodiment of the disclosure. Therefore, the expressions and description of the features and advantages of the disclosure in this specification may relate to the same embodiment, while it is not necessary so.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

In this specification, "an embodiment" or the similar expressions represent the fact that the combination of the particular features, structures, and properties in the embodiment are included in at least one embodiment of the disclosure. Therefore, in this specification, "in an embodiment" or the similar expressions do not necessarily refer to a same embodiment.

Those who skilled in the art will know that the disclosure can be embodied as a computer system, as a method, or as a computer accessible media as a product of computer programs. Therefore, the disclosure can be embodied as many forms such as pure hardware embodiment, pure software embodiment which comprises firmware, terminate-and-stay-resident programs, and micro-code programs, as well as embodiment of combination of hardware and software, which will be referred to "circuits", "modules", or "systems" in this specification.

One or more combination of compute applicable or computer accessible media can be utilized. Computer applicable or computer accessible media can be, for example, electrical, magnetic, optical, electromagnetic, infrared, or semiconducting systems, devices, or apparatuses. Moreover, embodiments of computer accessible media comprise but are not limited to following: electrical connections composed of one or more wires, portable computer discs, hard drives, random access memory (RAM), read-only memory (ROM), erasable programmable read-only memory (EPROM), flash memory, optical fibers, compact disc read-only memory (CD-ROM), optical storage apparatuses, transmission media such as Internet or intranet, or magneto storage. It should be noted that computer applicable or computer readable media can be hard copies on which source code of a computer program can be printed, and then the printings can be converted into electrical forms. For example, by using an optical scanner to scan the hard copy, the content contained in that hard copy can be compiled, interpreted, or processed by any manner to store into computer memory modules. In this specification, computer applicable or computer readable media can be any form of media used to preserve, store, deliver, propagate, or transport computer programs or source codes, for connected instruction repertoire, devices or apparatuses to process. Computer applicable media comprise dada signals, with baseband or carrier wave, storing computer applicable programs or source codes. Transmission of computer applicable programs or source codes may be in any appropriate media, including but not limited to wire, wireless, optical fibres, radio frequency (RF).

The computer program and its source code used to perform the disclosure can be implemented with one or more programming languages comprising object-oriented programming languages such as Java, Smalltalk, C++, and the like, as well as traditional procedural programming languages such as C or other similar programming languages.

The description about the disclosure below refers to the systems, apparatuses, methods and the flowcharts and/or block diagrams of the embodiments of the disclosure. Any one or more of the flowcharts and/or any block in the block diagrams, and any combination of the flowcharts and blocks in the block diagrams can be implemented by instructions of computer programs. These instructions can be executed by processors of common computers or specific computers, or by any form of machines with programmable data processing units, in order to perform the functions or operations described in the flowcharts and/or block diagrams.

These computer programs can be stored in computer readable media in order to direct computers or machines with programmable data processing units to perform specific functions. These computer programs comprise a finished product, in which the instructions perform the functions or operations described in the flowcharts and/or block diagrams Computer programs can be loaded onto computers or onto any form of machines with programmable data processing units, in order to perform a series of operation steps by the computer or programmable data processing unit, wherein the computer or programmable data processing unit produces computer execution procedures to achieve the functions or operations described in the flowcharts and/or block diagrams.

The disclosure is directed to a method and a system for preserving privacy of a dataset while keep the dataset accurate.

In one of some exemplary embodiments of the disclosure, a method is provided for taking the robustness of preservation of privacy, that is, k-anonymity or l-diversity, or both, imported by user as criteria for data clustering, and then determining data fields for masking.

Figure 2:
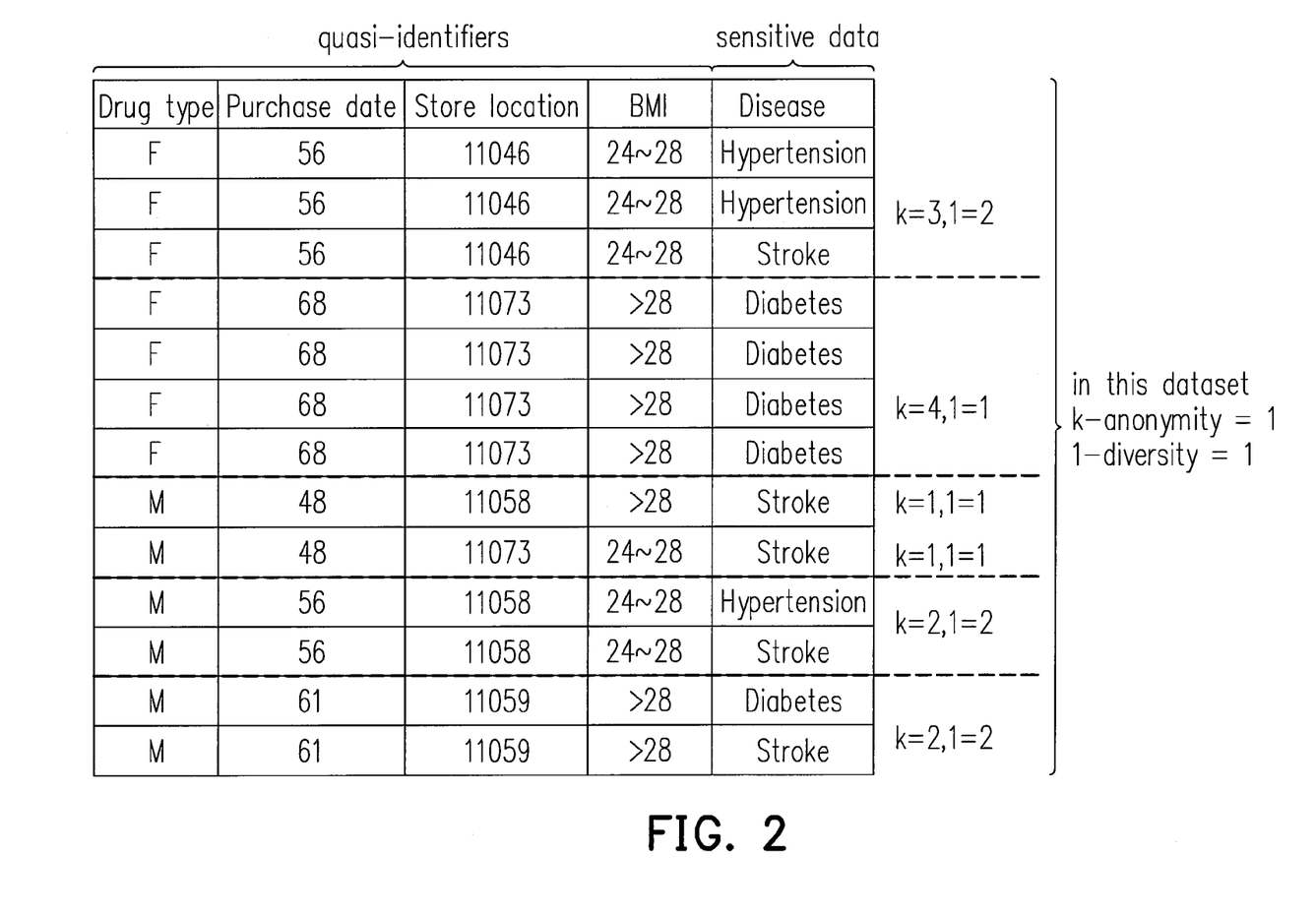
FIG. 2 illustrates k-anonymity and l-diversity of a dataset.

Refer to FIG. 2, which illustrates a method of taking the robustness of preservation of privacy by k-anonymity of the dataset, or in one embodiment, additionally by introducing l-diversity of the dataset.

To protect the anonymity of the entities of a dataset when releases microdata, data holders often remove or encrypt explicit identifiers, such as names and social security numbers. De-identifying data, however, provide no guarantee of anonymity. Released information often contains other data, such as race, birth date, sex, and ZIP codes, which can be linked to publicly available information to re-identify respondents and to infer information that was not intended for release. One of the emerging concepts in microdata protection is k-anonymity, which has been recently proposed as a property that captures the protection of a microdata table with respect to possible re-identification of the respondents to which the data refer. The k-anonymity demands that every tuple in the microdata table released be indistinguishably related to no fewer than k respondents. The related information about k-anonymity may be referred to some technical literatures. One of literatures illustrates the original k-anonymity proposal and its enforcement via generalization and suppression as means to protect respondents' identities while releasing truthful information. It also discusses different ways in which generalization and suppression can be applied, thus defining a possible taxonomy for k-anonymity and discussed the main proposals for solving the k-anonymity problems in the different models. It also illustrates further studies building on the k-anonymity concept to safeguard privacy. All disclosures are incorporated herein by reference herewith. All of the aforesaid technical literatures are incorporated herein by reference therewith and made a part of specification.

The related information about l-diversity may be referred to some technical literatures, One of literatures introduces the "l-diversity" that provides privacy even when the data publisher does not know what kind of knowledge is possessed by the adversary. The main idea behind l-diversity is the requirement that the values of the sensitive attributes are well-represented in each group. It shows that existing algorithms for k-anonymity may be adapted to compute l-diverse tables, and in an experimental evaluation it shows that l-diversity is practical and can be implemented efficiently. All of the aforesaid technical literatures are incorporated herein by reference therewith and made a part of specification.

In one of some exemplary embodiments of the disclosure, a method is provided for clustering data efficiently and flexibly in a dataset, particularly clustering data by decision-tree algorithm.

Moreover, FIG. 3 to FIG. 6 illustrate the apparatuses, methods, and flowcharts and block diagrams of executable structures, functions and operations of computer program products. Therefore, every flowchart or every block of block diagrams can represent a module, a segment or a portion of source codes, which comprise one or more executable instructions to perform particular logic functions. It should be noticed that in some embodiments, the functions revealed by the blocks may not proceed in the order shown in the diagrams. Two blocks connected with each other in a diagram, for example, can proceed simultaneously, or, in some situation, proceed in reverse order according to the related functions. Furthermore, every flowchart and/or every block of block diagrams, and any combination of flowcharts and blocks in the block diagrams, can be embodied by systems based on special purpose hardware, or by the combination of special purpose hardware and computer instructions, in order to perform specific functions or operations.

Figure 3:
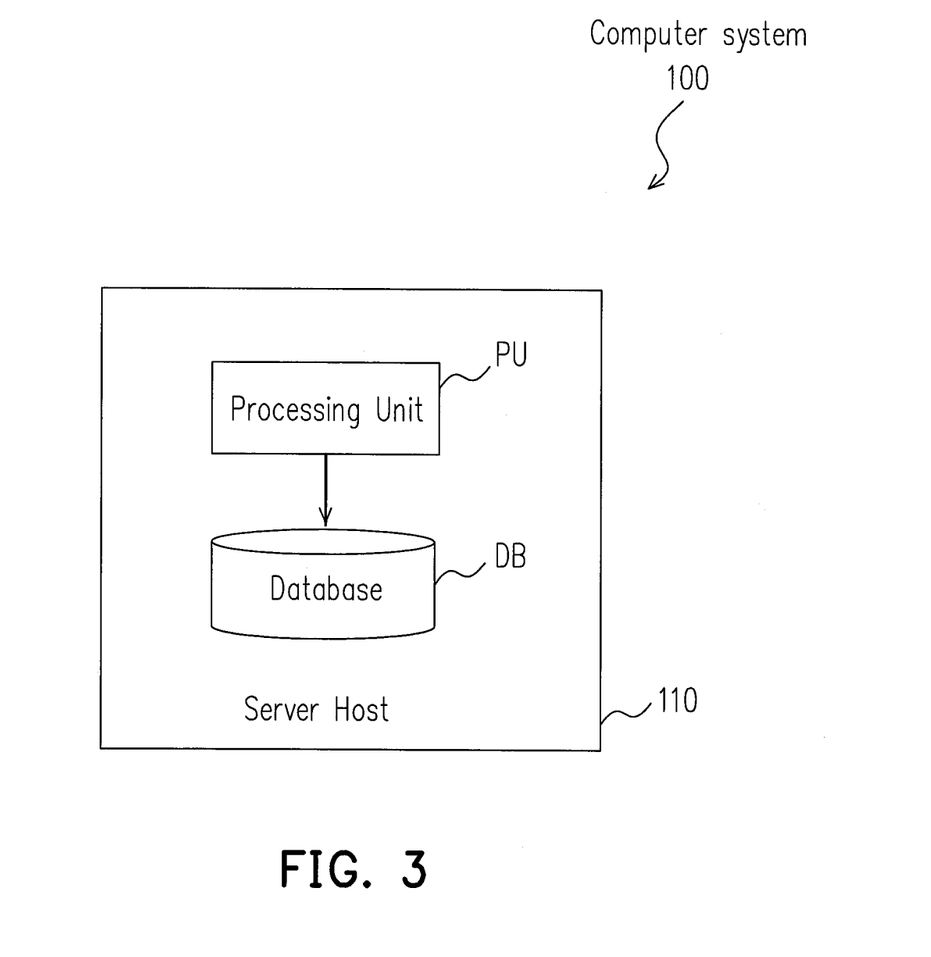
FIG. 3 illustrates a computer system in accordance with an embodiment of the disclosure.

FIG. 3 illustrates architecture of an exemplary system which is able to share information efficiently in one embodiment of the disclosure. The exemplary computer system 100, as in FIG. 3, may be used to let those who are skilled in the art understand the disclosure, but not limited thereto. The computer system 100 comprises a server host 110. The server host 110, comprising a processing unit (PU) and a database (DB), in one embodiment, may carry out a method illustrated in FIG. 5. The server host 110 may further comprise one or more storage devices to store the database DB, source codes, and other information. The server host 110 may further comprise a display device, a communication device, and/or an input and output devices, which are used as an interface for a user to communicate with the server host 110. The server host 110 may further comprise one or more peripherals or other special purpose components. The disclosure may be implemented in other forms of other embodiments which comprise more or less devices, apparatuses, or components.

The server host 110 may be a common general purpose computer, a special purpose computer, a high-level workstation, a mainframe, such as IBM System X, Blade Center, or eServer. The server host 110 may have the capability of network communication, which can be implemented in any form of connections, including connections of local area network (LAN) or wide area network (WAN), connections via Internet provider to connect to Internet by dial-up, or other wire or wireless connections. Moreover, other hardware and software components such as additional computer systems, routers, firewalls, and so forth, although not depicted herein, may be included in the network.

It is noticed that, in the disclosure, a plurality of functional units are labelled as functional blocks or modules to emphasize the independence of implementation. Functional blocks or modules, for example, may be embodied as hardware circuits comprising customized VLSI or gate circuits, such as off-the-shelf semiconductors of logic chips, transistors, or other discrete components. Modules may be implemented in programmable hardware components, such as field programmable gate arrays (FPGA), programmable logic arrays (PLA), programmable logic devices (PLD), or other similar components. Besides, modules may be implemented in some software executed by all kinds of processors. Identification modules with executable codes comprise one or more physical or logical blocks, which may form objects, procedures, or functions. However, executable codes of the identification modules may not necessarily be contiguous to each other in a physical relationship; rather they can comprise different instructions in different addresses. Logically, the instructions altogether constitute the one or more modules and accomplish the purposes of the modules.

An executable module may comprise a single instruction or a plurality of instructions distributed in a plurality code segments, in a plurality of programs, or in a plurality of memory devices. Similarly, operation data in the identification module may be in any appropriate form implemented in any appropriate type of data structure, and can be collected as a single dataset, or distributed in a plurality of locations in the same or in different storage devices. In addition, the operation data may partially exist at least temporarily in a form of electrical signals.

Figure 4:
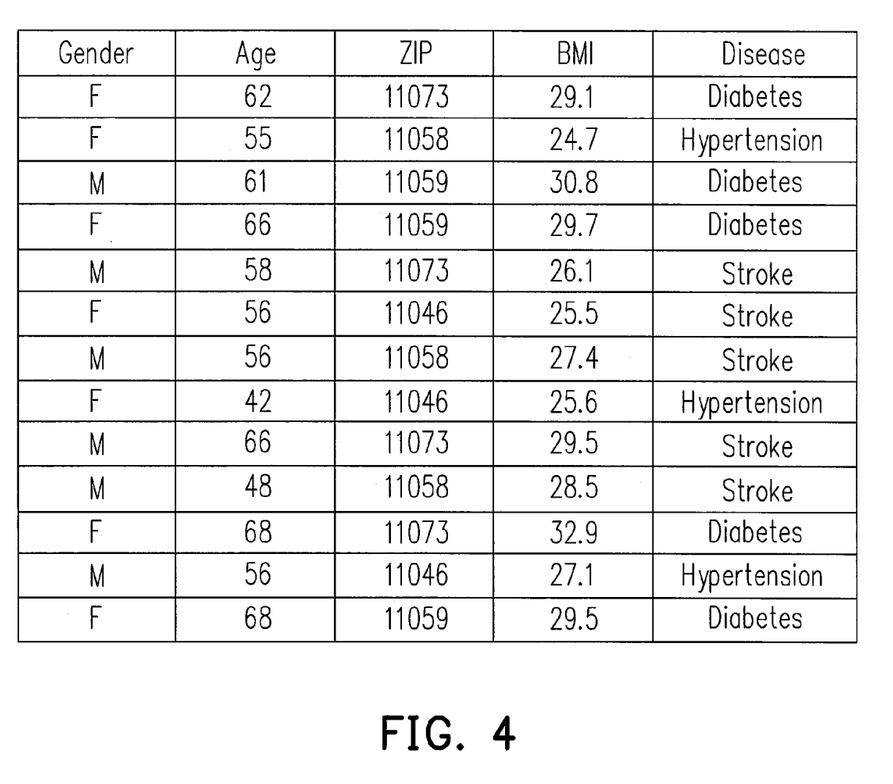
FIG. 4 is an exemplary dataset used to illustrate an embodiment of the disclosure.

FIG. 4 is an exemplary medical record as a dataset of one of the embodiments of the disclosure. There are five exemplary fields in the data set, which are "Gender", "Age", "ZIP Code", "BMI", and "Disease", respectively. For illustrating of the disclosure, the field "Disease" is set as sensitive data while other four fields, are quasi-identifiers. As mentioned above, however, those who skilled in the art should know that the disclosure is not limited to the embodiment. Detailed discussion on sensitive data fields and quasi-identifier fields are elaborated in US Pat. Application No. 2011/0119661, which is incorporated herein by reference.

Figure 5:
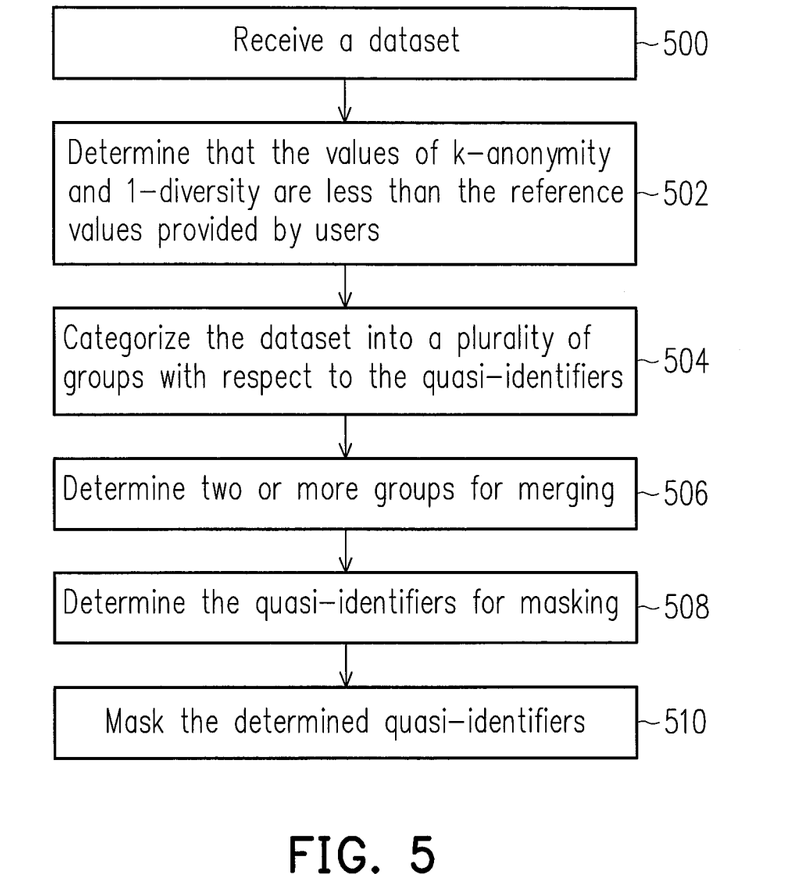
FIG. 5 is a flowchart illustrating a method for preserving privacy of a dataset according to an embodiment of the disclosure.

FIG. 5 is an exemplary flowchart of one of embodiments corresponding to the method for preserving privacy of the dataset in FIG. 4, with the system 100 in FIG. 3 of the disclosure.

In step 500, the server host 110 receives a dataset and stores the dataset into the database DB. More appropriately, the name field in the dataset may be anonymized before further manipulation, as illustrated in FIG. 4. Therefore, in one embodiment, according to the method revealed in US Pat. Application No. 2011/0119661, one or more quasi-identifiers may be identified from the dataset in FIG. 4, that is, one or more of the fields "Gender", "Age", "ZIP Code", and "BMI" may be identified as quasi-identifiers. The values of k-anonymity K and l-diversity L of sensitive data may be determined. For example, the values of k-anonymity K or l-diversity L of the field "Disease" identified as the sensitive data may be determined, that is, K is 1 and l-diversity L is 1, as shown in FIG. 4. It should be noticed that if different methods proposed with automatic or artificial techniques were adopted to identify quasi-identifiers in other embodiments, the number of identified quasi-identifiers may not be the same as the method proposed in US Pat. Application No. 2011/0119661. Apparently, different values of k-anonymity K and l-diversity L may be produced based on different quasi-identifiers.

In step 502, the server host 110 receives the reference value $K_r$ for the k-anonymity, and the reference value $L_r$ of the l-diversity, respectively, provided by the user. In the embodiment, $K_r$ is 2 and $L_r$ is 2, as determined by the user. According to the given values of $K_r$ and $L_r$, the server host 110 judges that K (which is 1) is less than the reference value $K_r$ (which is 2), and L (which is 1) is less than the reference value $L_r$ (which is 2). Thus, the process goes to step 504.

In step 504, according to the given quasi-identifiers, "Gender", "Age", "ZIP Code", and "BMI", as illustrated in the embodiment, the dataset in FIG. 4 is clustered into a plurality of groups or clusters. Entries in the same group have the same values in the fields of the quasi-identifiers, while entries in different groups have different values in the fields of quasi-identifiers. That is, entries in different groups are with different values in one or more fields of "Gender", "Age", "ZIP Code", and "BMI". In other words, the types of the groups are delimited by the combinations of the quasi-identifiers such as "Gender", "Age", "ZIP Code", and "BMI". It should be noticed that in step 504, it is not necessary to use all quasi-identifiers in step 500.

Figure 6:
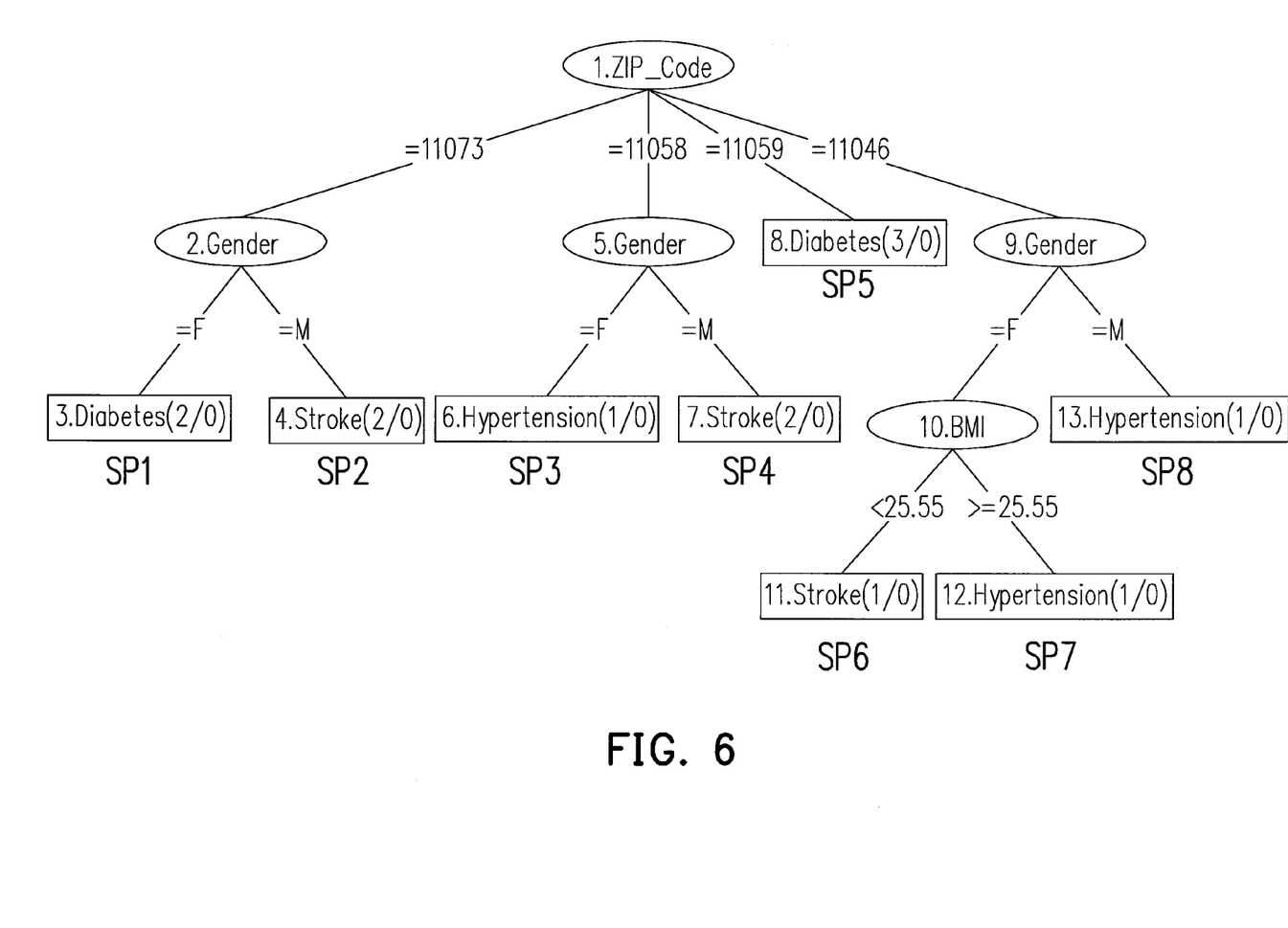
FIG. 6 illustrates a decision tree according to an embodiment of the disclosure.

FIG. 6 schematically illustrates an embodiment of clustering the dataset by a decision tree via the decision tree algorithm disclosure by Friedman, A., Schuster, A. & Wolff, R. In the embodiment, the dataset is clustered via the decision tree algorithm into a plurality of different groups SP1-SP8, each of which is corresponding to singular path of the paths in the decision tree, respectively. In the embodiment, the combinations of three quasi-identifiers, "Gender", "ZIP Code", and "BMI" are used to delimit the groups. It is noticed that clustering methods in the art do not adopt the decision tree algorithm as in the embodiment. In the embodiment, the dataset is clustered into a plurality of groups based on the quasi-identifiers determined from the decision tree algorithm. On the contrary, the methods in the art need a plurality of parameters input from the users, such as the number of groups or clusters being clustered, definition of similarity, and so forth, which makes the methods in the art be not as flexible as the proposed method in the embodiment.

In step 506, two or more of the groups SP1-SP8SP1-SP8 from step 504 are merged.

As illustrated in FIG. 6, the numbers of entries (data), N1~N8, of the groups SP1-SP8 are [2, 2, 1, 2, 3, 1, 1, 1], and the numbers of value types of sensitive data fields (like "Disease" for example), V1~V8, of the groups SP1-SP8 are [1, 1, 1, 1, 1, 1, 1, 1]. The minimum value of the numbers N1~N8 determines the value of k-anonymity of the whole dataset; similarly, the minimum value of the numbers V1~V8 determines the value of l-diversity of the whole dataset. It is noticed that the groups SP1-SP8 in FIG. 6 are used for illustrative purpose for the disclosure, and it is not limited to cluster the dataset based on the order in FIG. 6. Thus, the number of entries N and the number of value types of the sensitive data fields V may not be the same as those in FIG. 6, if different clustering orders are used. However, as long as the same quasi-identifiers are used for clustering, the minimum number of the numbers N1~N8 and the minimum number of the numbers V1~V8 are the same. Therefore, the value of k-anonymity and the value of l-diversity do not alter in different clustering orders as long as the same quasi-identifiers are used therefor.

Moreover, if only the k-anonymity of the dataset is considered in the embodiment, the numbers N3, N6, N7 and N8 of entries of the groups SP3, SP6, SP7, and SP8, are all 1, respectively, which are less than the reference value of k-anonymity ($K_r$=2, for example), provided by users. Thus, the groups SP3, SP6, SP7, and SP8 may be merged with other groups to obtain a greater number of entries, $N_m$. The merging group increases the value of k-anonymity to conform to the reference value of k-anonymity $K_r$.

To ensure a higher degree of robustness of preservation of privacy, the l-diversity may be taken into consideration with the k-anonymity. In the embodiment, the numbers of value types of the sensitive data field "Disease" V1~V8 of the groups SP1-SP8 are all 1, which are less than the reference value of l-diversity, $L_r$(2), provided by users in step 502. Thus these groups may be merged to obtain a greater number of value types of the sensitive data field "Disease", V. The greater number $V_m$ may increase the value of l-diversity to conform to the reference value of l-diversity $L_r$.

One of some embodiments is provided below to illustrate the case that both k-anonymity and l-diversity are taken into consideration. In the embodiment, the numbers of value types of the sensitive data field Disease of groups SP1-SP8 are all less than the reference value of l-diversity $L_r$, thus each of the groups SP1-SP8 needs being merged with some other groups to promote or increase the l-diversity. On the contrary, if only k-anonymity is concerned, then only the groups SP3, SP6, SP7, and SP8 need to be merged.

After two or more groups are merged into one merging group, one or more quasi-identifiers would be masked based on the purpose of equivalence. To avoid damaging the data utility of the dataset, the number of entries and the number of value types of the field Disease are kept as less as possible. In the embodiment, two or more groups are merged into one merging group based on the requirement that the number of entries $N_m$ and/or the number of value types of the field Disease $V_m$ are minimized while are not less than the corresponding reference values from users. In another embodiment, two or more groups are merged into one merging group based on the requirement that the distance of path of each group of the decision tree are minimized. In other embodiments, number of entries and the distance of path may be taken into consideration simultaneously, or users can provide customized criteria for merging, such as assigning different weights to the number of entries and to distance of path, other parameters, or providing the precedence or sequence of merging of each group.

For illustration, the groups SP1 and SP2 are merged into a merging group M1, and the groups SP3, SP4, and SP5 are merged into another merging group M2, while the groups SP6, SP7, and SP8 are merged into a further merging group M3. The numbers of entries of merging groups M1, M2, and M3 are [4, 6, 3], respectively, and are not less than the k-anonymity $K_r$(2) provided by users in step 502. The numbers of value types of the field Disease of merging groups M1, M2, and M3 are [2, 3, 2], respectively, and are not less than the l-diversity $L_r$(2) provided by users in step 502.

If the number of entries or the number of value types of the field Disease, or both, of the merging group is still less than the reference value, then the merging group may be further merged with other groups until the number of entries and the number of value types of the field Disease of corresponding groups are not less than the reference values $K_r$ and $L_r$, respectively.

Although both k-anonymity and l-diversity are taken into consideration in aforementioned embodiment, those who skilled in the art should be able to handle the cases with which only k-anonymity is concerned.

In step 508, it is determined that the quasi-identifiers being selected to be masked in each merging group M1-M3, respectively. The selected quasi-identifiers being masked are required to be used to distinguish the basic groups forming the merging groups M1-M3 from at least two or more of the groups SP1-SP8. For example, the merging group M1 is composed of two basic groups SP1 and SP2, and the field "Gender" can be used to distinguish SP1 from SP2 since SP1 and SP2 have different values in "Gender", therefore "Gender" is the candidate being masked. For the merging group M2, "Gender" and "ZIP Code" together distinguishes the basic groups SP3, SP4, and SP5 from each other, thus "Gender" and "ZIP Code" are the fields capable of being selected to be masked. Merging group M3 is composed of SP6, SP7, and SP8, and the three basic groups have different values of the combination of "ZIP Code" and "BMI", as a result, "ZIP Code" and "BMI" are the fields being selected to be masked.

In step 510, the quasi-identifiers being selected or determined at step 508 are masked. Methods used to mask the quasi-identifiers are classified into two categories: perturbative and non-perturbative, which are known very well by those who skilled in the art. It is not limited to adopt the same masking method for different merging group or for different quasi-identifiers in this disclosure.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A method for preserving privacy of a dataset, where the dataset has at least a sensitive data field and one or more fields of at least one first quasi-identifier, the method comprising:
   determining a k-anonymity value K with respect to the sensitive data field according to the at least one first quasi-identifier;
   determining to adopt the at least one first quasi-identifier to categorize the dataset into a plurality of groups, if the k-anonymity value K is less than a reference number Kr, wherein data entries in each of the plurality of groups have the same value in the one or more fields of at least one first quasi-identifier and data entries in different groups of the plurality of groups have different values in the one or more fields of at least one first quasi-identifier;
   determining the number of data entries in each of the plurality of groups;
   determining a first group among the plurality of groups, wherein the number of data entries, N1, in the first group is less than the reference number Kr;
   determining a second group among the plurality of groups, whereby when the first group and the second group are merged into a merging group, the number of data entries, Nm, in the merging group is not less than the reference number Kr; and
   masking the one or more fields of at least one first quasi-identifier for the merging group.

2. The method for preserving privacy of a dataset as claimed in claim 1, wherein the step of masking the one or more fields of at least one first quasi-identifier for the merging group further comprises:
   determining the one or more fields to be masked of at least one first quasi-identifier for the merging group, wherein prior to masking, the values of the fields being masked of the first group are distinct from the values of the same fields being masked of the second group.

3. The method for preserving privacy of a dataset as claimed in claim 1, wherein the step of determining a second group among the plurality of groups further comprises: determining the second group, wherein Nm is a minimum value.

4. The method for preserving privacy of a dataset as claimed in claim 1, wherein the step of determining a k-anonymity value K with respect to the sensitive data field further comprises:
   allowing users to determine the value of the reference number Kr.

5. The method for preserving privacy of a dataset as claimed in claim 4, wherein the step of determining the second group among the plurality of groups further comprises:
   determining the second group, wherein Vm is the minimum value.

6. The method for preserving privacy of a dataset as claimed in claim 4, wherein the step of determining to adopt the at least one first quasi-identifier to categorize the dataset into the plurality of groups further comprises:
   allowing users to determine the value of the reference number Lr.

7. The method for preserving privacy of a dataset as claimed in claim 1, wherein the step of determining the k-anonymity value K with respect to the sensitive data field further comprises:
   determining a l-diversity value L with respect to the sensitive data field according to the at least one first quasi-identifier;
   the step of determining to adopt the at least one first quasi-identifier to categorize the dataset into the plurality of groups further comprises: determining to adopt the at least one first quasi-identifier to categorize the dataset into a plurality of groups, if the l-diversity value L is less than a reference number Lr;
   the step of determining the number of the data entries in each of the plurality of groups further comprises: determining the number of values of the sensitive data field of the data entries in each group;
   the step of determining the first group among the plurality of groups further comprises: determining the first group among the plurality of groups, wherein the number of values of the sensitive data field of the data entries, V1, in the first group is less than the reference number Lr;
   the step of determining the second group among the plurality of groups further comprises: determining the second group, whereby the number of values of the sensitive data field of the data entries, Vm, in the merging group is not less than the reference number Lr.

8. The method for preserving privacy of a dataset as claimed in claim 7, wherein the step of determining the second group among the plurality of groups further comprises:
   determining the second group, wherein Nm is the minimum value.

9. The method for preserving privacy of a dataset as claimed in claim 1, wherein the step of determining the second group among the plurality of groups further comprises:
   determining the second group, whereby the merging group complies with a set of criteria provided by users.

10. The method for preserving privacy of a dataset as claimed in claim 1, wherein the step of determining the second group among the plurality of groups further comprises:
    the step proceeds by decision tree algorithm;
    the step of determining the second group among the plurality of groups further comprises: determining the second group, wherein a distance of a path of the first group and a distance of a path of the second group according to the decision tree are minimized.

11. A product of computer programs stored in a non-transitory computer accessible medium, which comprises a set of computer readable programs for embodying the methods as claimed in claim 1 in one or more computer systems.

12. A computer system, which comprises:
    a host, which comprises:
    a bus system;
    a memory module connecting to the bus system, wherein a set of computer executable instructions is included; and
    a processing unit connecting to the bus system, where the processing unit executes the set of computer executable instructions for embodying methods as claimed in claim 1.

* * * * *